United States Patent
Biermann et al.

(10) Patent No.: US 10,550,560 B2
(45) Date of Patent: Feb. 4, 2020

(54) TOILET OVERFLOW CONTAINMENT SYSTEM

(71) Applicant: Walmart Apollo, LLC, Bentonville, AR (US)

(72) Inventors: Matthew Dwain Biermann, Fayetteville, AR (US); Nicholaus Adam Jones, Fayetteville, AR (US); Steven Jackson Lewis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 85 days.

(21) Appl. No.: 15/970,119

(22) Filed: May 3, 2018

(65) Prior Publication Data

US 2018/0320355 A1 Nov. 8, 2018

Related U.S. Application Data

(60) Provisional application No. 62/501,301, filed on May 4, 2017.

(51) Int. Cl.
  *E03D 11/13* (2006.01)
  *E03D 5/10* (2006.01)
  *E03D 1/32* (2006.01)

(52) U.S. Cl.
  CPC ............ *E03D 11/13* (2013.01); *E03D 1/32* (2013.01); *E03D 5/10* (2013.01)

(58) Field of Classification Search
  CPC ........................................... E03D 11/13
  USPC .................................................. 4/427
  See application file for complete search history.

(56) References Cited

U.S. PATENT DOCUMENTS

| | | | |
|---|---|---|---|
| 4,204,285 A | 5/1980 | Pak | |
| 6,810,902 B2* | 11/2004 | Bootka | E03C 1/242 137/312 |
| 8,776,280 B2 | 7/2014 | Baranj et al. | |
| 9,027,171 B2* | 5/2015 | Lagobi | E03C 1/281 137/247.41 |
| D169,628 S | 10/2015 | Komorita | |
| 2005/0283899 A1* | 12/2005 | Feda | E03D 5/026 4/427 |
| 2006/0059610 A1 | 3/2006 | Conant | |
| 2006/0242756 A1* | 11/2006 | Fields | E03D 11/00 4/427 |
| 2007/0157374 A1* | 7/2007 | Morris | E03D 5/026 4/427 |
| 2011/0048555 A1 | 3/2011 | Malouf et al. | |
| 2015/0238064 A1 | 8/2015 | Chilcoat | |
| 2015/0299998 A1* | 10/2015 | Stack | E03D 11/13 4/427 |

(Continued)

*Primary Examiner* — Lori L Baker
(74) *Attorney, Agent, or Firm* — McCarter & English, LLP; David R. Burns

(57) ABSTRACT

Methodologies, systems, and computer-readable media are provided for containing fluid from an overflowing toilet. An annular fluid containment basin is located near the base of a toilet and is configured to encircle the base of the toilet and collect fluid flowing down the exterior surface of the toilet. A moisture sensor is located within the annular fluid containment basin and configured to sense a spill. A drain is also located within the annular fluid containment basin to direct fluid to bypass an S-bend or trap connected to the toilet.

19 Claims, 4 Drawing Sheets

(56) References Cited

U.S. PATENT DOCUMENTS

2016/0040418 A1 2/2016 Morris
2016/0047113 A1* 2/2016 Orubor .................. E03D 11/13
4/427

* cited by examiner

TOILET OVERFLOW CONTAINMENT SYSTEM

RELATED APPLICATIONS

This application claims priority to U.S. Provisional Patent Application No. 62/501,301 entitled "TOILET OVERFLOW CONTAINMENT SYSTEM," filed on May 4, 2017, the content of which is hereby incorporated by reference in its entirety.

BACKGROUND

Toilets can be vulnerable to clogging and overflowing, and maintenance for clogged and overflowing toilets is important for preventing slips and ensuring sanitation. Conventionally, maintenance for clogged and overflowing toilets can be provided at scheduled intervals by a custodial worker.

SUMMARY

Embodiments of the present invention disclose a toilet overflow containment system including an annular fluid containment basin disposed near the base of an exterior surface of a toilet and configured to encircle the base to collect fluid flowing down the exterior surface. The system also includes a drain within the annular fluid containment basin to direct fluid to bypass an S-bend or trap connected to the toilet, and a moisture sensor disposed within the annular fluid containment basin and configured to sense and communicate the presence of a spill.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present invention will be more fully understood from the following description of exemplary embodiments when read together with the accompanying drawings, in which.

DETAILED DESCRIPTION

Figure 1:
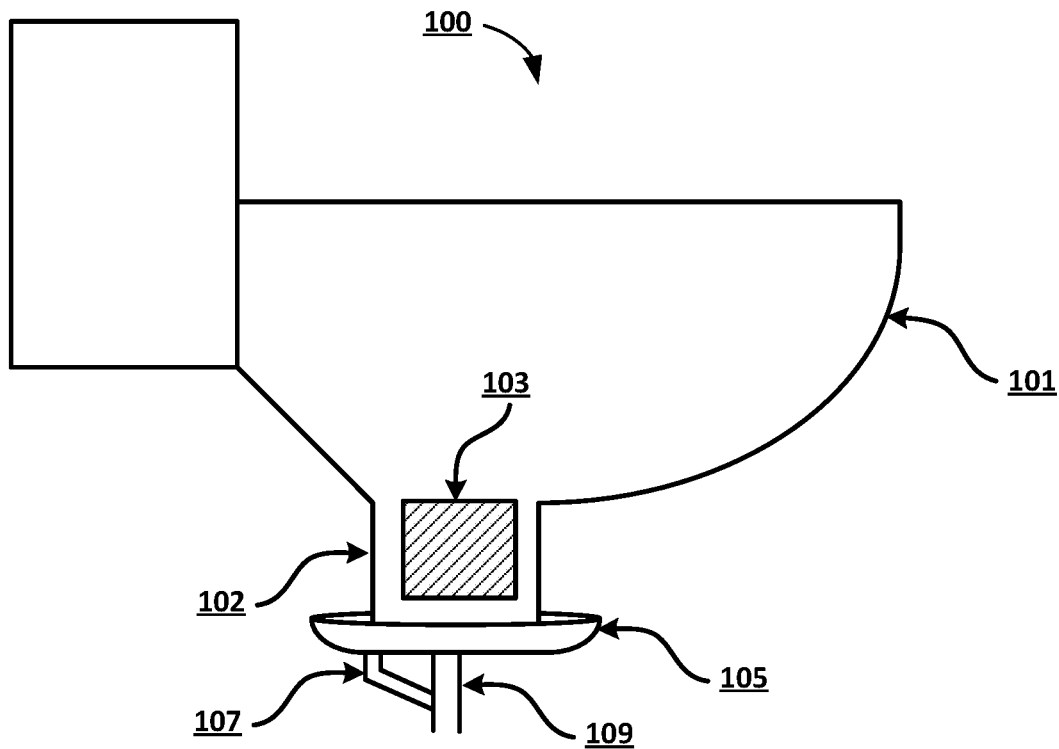
FIG. 1 illustrates a toilet overflow containment system, according to an exemplary embodiment.

Following below are more detailed descriptions of various concepts related to, and embodiments of, inventive methods, apparatus, and systems for containing a toilet overflow and transmitting maintenance notifications. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

Methodologies, systems, apparatus, and non-transitory computer-readable media are described herein to facilitate containing and detecting a toilet overflow situation and generating notifications to request maintenance when a toilet overflow is detected. In exemplary embodiments, a toilet overflow containment system includes an annular basin that encircles the base of a toilet and can catch and contain fluid that flows down the outer surface of the toilet. For example, when a toilet is clogged and overflowing, water from the toilet will typically flow over the top of the bowl and down the outer surface of the toilet onto the floor. The annular containment basin disclosed herein is designed to be permanently or removably fixed to the base of the toilet in order to catch and retain this water. In some embodiments, the annular basin can have any suitable form factor or footprint geometry in order to catch water flowing down the outer surface of the toilet. The annular basin can also include a moisture sensor that can detect a spill. The sensor can be in communication with a processing device, either located at the toilet or at a remote location, that can notify a responsible individual when a spill is detected. In exemplary embodiments, a drain is also located within the annular basin in order to drain fluid from the basin. In some embodiments, the drain from the annular basin can be designed to bypass an S-bend or trap in the toilet.

In exemplary embodiments, the annular basin also includes a level indicator that can indicate an amount of fluid spilled and collected by the annular basin. The moisture sensor and/or the processing device can also be in communication, in some embodiments, with a door locking mechanism that can lock the door of a bathroom stall once a spill is detected. The stall can also be equipped with a motion detector in order to prevent a person from being inadvertently locked within the stall when the spill is detected. In exemplary embodiments, the moisture sensor and/or the processing device can also be in communication with a fluid shutoff valve that can block the water supply to the toilet after a spill is detected.

In exemplary embodiments, a computing system can be configured to monitor moisture sensors within a number of different stalls, each equipped with an annular containment basin and a moisture sensor. The system can monitor when a spill is detected at any of the stalls, and in some embodiments can determine the severity of each spill detected. The system can also control fluid shutoff valves for each of the stalls and prevent further overflow of one or more toilets in response to detecting a spill. In exemplary embodiments, the system can also control locking mechanisms for each of the stalls to lock the doors of stalls where a toilet is overflowing, thus preventing unauthorized persons from entering a non-functioning stall. Once one or more spills are detected, the system can generate and transmit notifications prompting one or more individuals to provide maintenance to the stalls where spills are detected. In exemplary embodiments, a notification is sent to a mobile device associated with a custodial worker and indicates an order in which the worker should attend to each spill based on the severity of the spill. In some embodiments, the notification is transmitted to a mobile device associated with a custodial worker based on the proximity of the device to the detected spill (i.e., the notification is sent to the device of the closest custodial worker).

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 illustrates a toilet overflow containment system 100, according to an exemplary embodiment. In this example embodiment, the toilet overflow containment system 100 includes a toilet 101 having a base portion 102 and a trap or S-bend 103. An annular fluid containment basin 105 is disposed near the base 102 of the toilet 101 and encircles the base 102 to collect fluid flowing down an exterior surface of the toilet 101. In exemplary embodiments, the system 100 also includes a drain 107 disposed within the annular fluid containment basin 105 and configured to direct fluid to bypass the trap 103 of the toilet 101. In this example embodiment, the drain 107 drains fluid from the annular fluid containment basin 105 and directs it to a portion of a drainage pipe 109 downstream of the toilet 101. The system 100 also includes a moisture sensor disposed within the annular fluid containment basin 105 that is configured to sense a spill. The moisture sensor will be discussed in more detail below in reference to FIG. 2. In exemplary embodiments, the annular fluid containment basin 105 is integral to the base 102 of the toilet 101. In alternative embodiments, the annular fluid containment basin 105 is removable from the base 102 of the toilet 101. It will be appreciated that the annular fluid containment basin 105 can have any suitable footprint or form factor for encircling the base 102 of the toilet 101 that enables the retention of fluid that flows down the outer surface of the toilet 101.

In exemplary embodiments, the drain 107 of the annular fluid containment basin 105 can include a trap or S bend, and a fluid supply line of the toilet 101 can also provide some water directly into the annular fluid containment basin 105. When a trap or S bend is implemented in the drain 107 of the annular fluid containment basin 105, a bypass drain can go around the trap or S bend when extra fluid is detected within the annular fluid containment basin 105. In alternative embodiments, the drain 107 of the annular fluid containment basin 105 can include a door or valve that can be configured to open when moisture is sensed within the annular fluid containment basin. These example embodiments can help prevent smells emanating from the drain 107.

Figure 2:
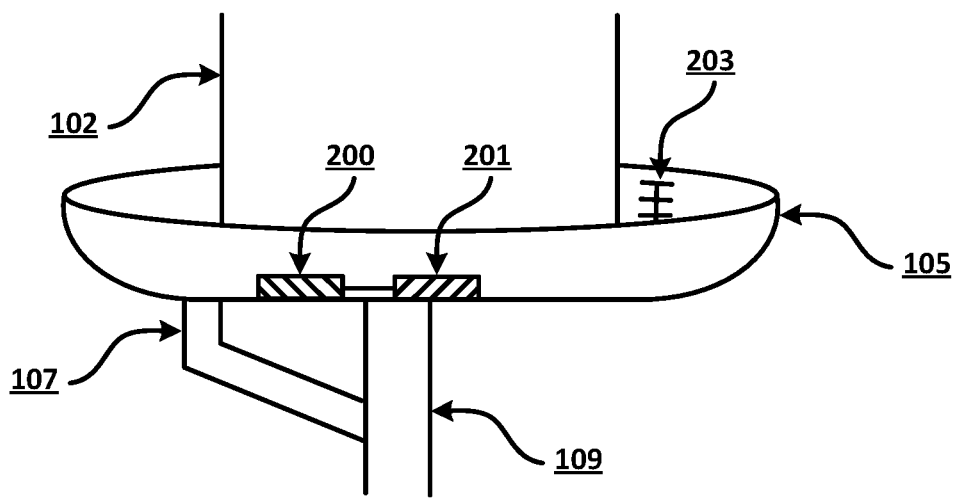
FIG. 2 illustrates an enlarged view of a portion of the system of FIG. 1, according to an exemplary embodiment.

FIG. 2 illustrates an enlarged view of a portion of the system 100 of FIG. 1, according to an exemplary embodiment. In this exemplary embodiment, the annular fluid containment basin 105 encircles the base 102 of the toilet in order to receive and retain fluid that flows down the base 102 of the toilet. A drain 107 is disposed within the annular fluid containment basin 105 and is configured to direct fluid to bypass the trap of the toilet and join a drainage pipe 109 downstream of the toilet, as disclosed in reference to FIG. 1. In exemplary embodiments, the annular fluid containment basin 105 includes a level indicator 203 on an interior wall of the basin 105 that can visually indicate the amount of fluid spilled. The system can also include a moisture sensor 200 within the annular fluid containment basin 105 that is configured to sense a spill and a processing device 201 in communication with the moisture sensor 200. The moisture sensor 200 can be configured, in some embodiments, to detect a severity of the spill by detecting, for example, an amount of fluid within the basin 105 or a water level of the fluid within the basin 105. In exemplary embodiments, the processing device 201 is configured to transmit a notification via wired or wireless communication to a remotely located computing device indicating that the toilet needs maintenance. Such a notification can indicate, in some embodiments, a severity of the spill detected enabling the computing device to assign a priority to the task of cleaning up the detected spill.

Figure 3:
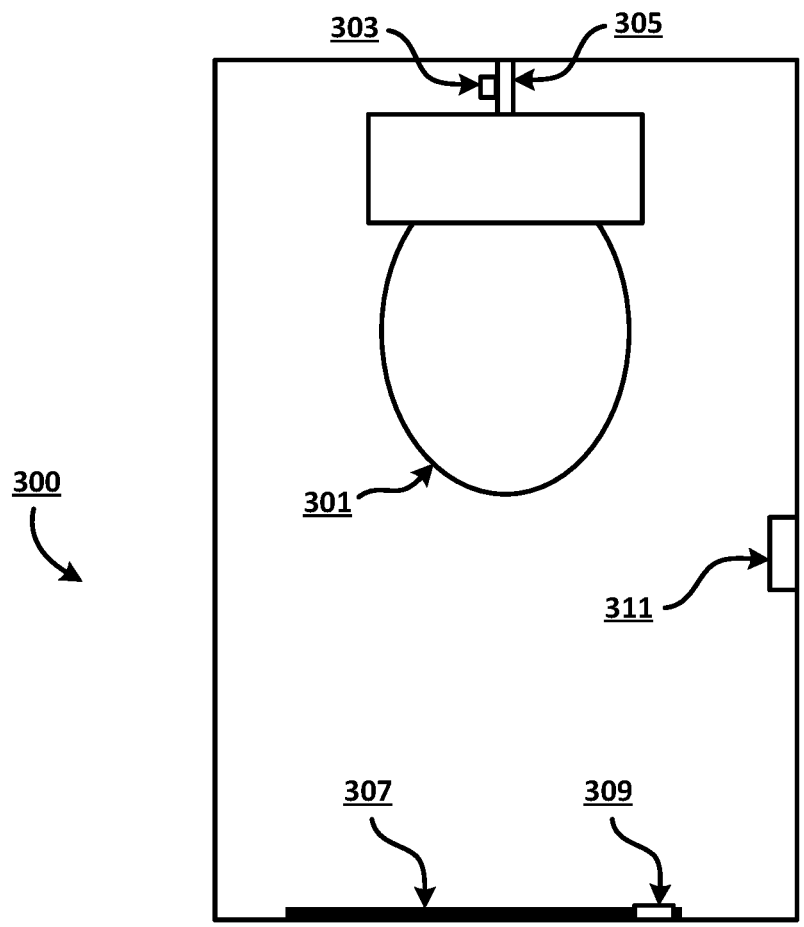
FIG. 3 is a top-down view of a stall equipped with an overflow containment and door locking system, according to an exemplary embodiment.

FIG. 3 is a top-down view of a bathroom stall 300 equipped with a door locking system, according to an exemplary embodiment. In this example embodiment, a toilet 301 is disposed within the bathroom stall 300. A fluid supply line 305 provides fluid to the toilet, and a fluid shutoff valve 303 can control the supply of fluid to the toilet 301. As discussed above in reference to FIGS. 1-2, the toilet 301 can include an annular fluid containment basin, a drain disposed within the annular fluid containment basin, and a moisture sensor disposed within the annular fluid containment basin. The annular fluid containment basin can be disposed near a base portion of the toilet and can be configured to encircle the base of the toilet to collect fluid flowing down the exterior surface of the toilet when there is a leak. The drain can be configured to direct fluid from the annular fluid containment basin to bypass an S-bend or trap connected to the toilet, and the moisture sensor can be configured to sense a spill. In exemplary embodiments, the bathroom stall 300 also includes a door locking mechanism 309 that is in direct or indirect communication with the moisture sensor and configured to lock a door 307 of the bathroom stall 300 when a spill is detected.

As discussed in reference to FIG. 2, a processing device can be in communication with a moisture sensor associated with the toilet 301 in order to detect when a spill occurs and transmit suitable notifications. In exemplary embodiments, the processing device can also be configured to transmit a notification to the door locking mechanism 309 in order to prompt the door locking mechanism 309 to lock the door 307 and prevent unauthorized persons from entering the bathroom stall 300 following a spill. The door locking mechanism 309 can include, for example, a magnetic door lock or a mechanical door lock controlled by a processor. In some embodiments, the door locking mechanism 309 can unlock the door in response to a communication received from a remote server or an electronic device associated with a person designated to provide maintenance to the bathroom stall 300. In exemplary embodiments, the bathroom stall 300 is also equipped with a motion sensor 311, such as an infrared sensor, that is in communication with the door locking mechanism 309. The motion sensor 311 can be configured to prevent locking the door 307 of the bathroom stall 300 if movement is detected within a pre-determined amount of time, in some embodiments. This can prevent a person from being inadvertently locked within the bathroom stall 300.

In exemplary embodiments, the fluid shutoff valve 303 can also be in communication with the moisture sensor within the annular fluid containment basin and can be configured to interrupt the supply of fluid to the toilet through the fluid supply line 305 in response to the moisture sensor detecting a spill. In some embodiments, once the spill has been stopped, the fluid shutoff valve 303 can be configured to reconnect supply of fluid to the toilet via the fluid supply line 305.

Figure 4:
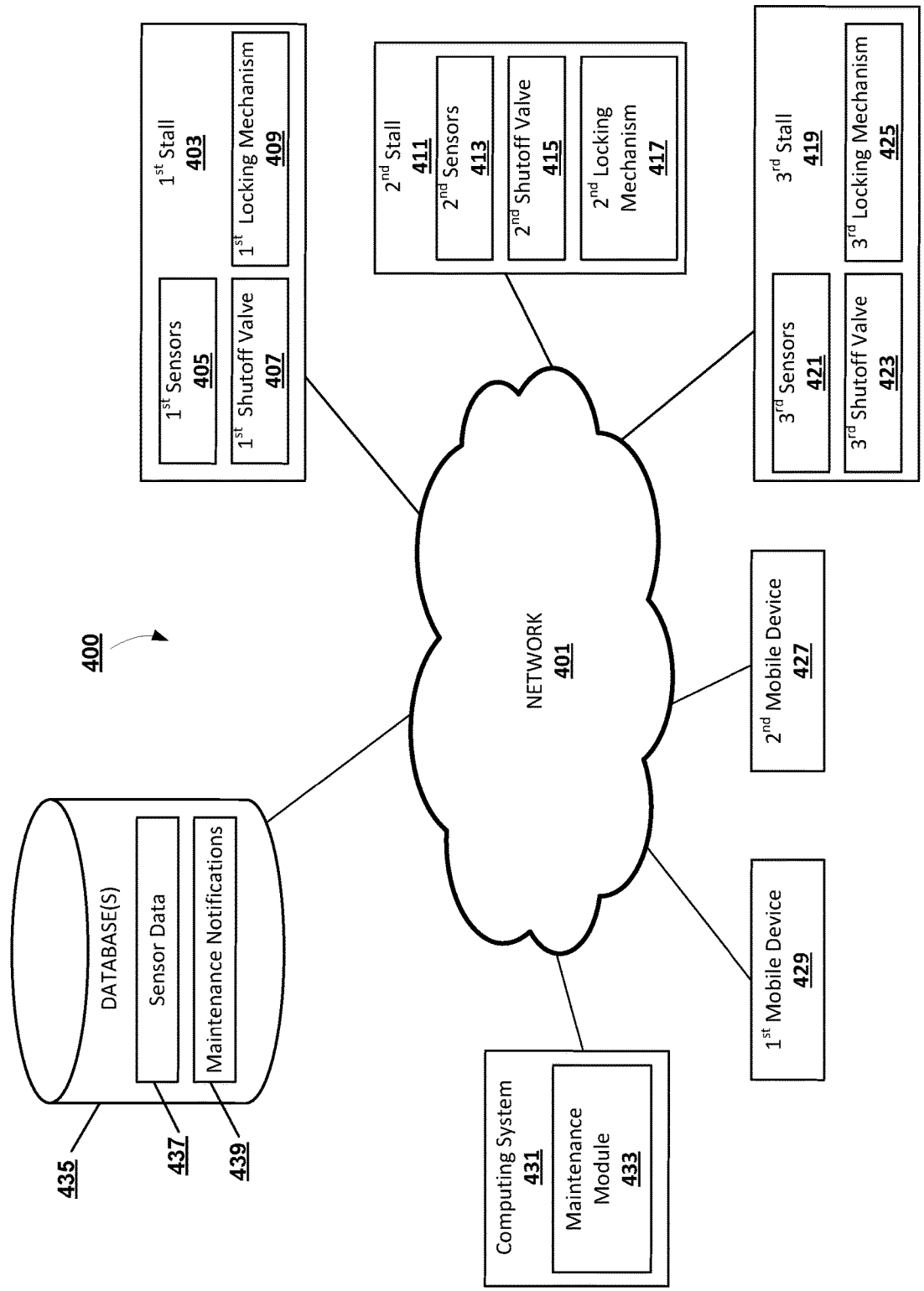
FIG. 4 is a diagram of an exemplary network environment suitable for a distributed implementation of an exemplary embodiment.

FIG. 4 illustrates a network diagram depicting a system 400 suitable for a distributed implementation of an exemplary embodiment. The system 400 can include a network 401; a first bathroom stall 403 equipped with first sensors 405, a first shutoff valve 407, and a first locking mechanism 409; a second bathroom stall 411 equipped with second sensors 413, a second shutoff valve 415, and a second locking mechanism 417; a third bathroom stall 419 equipped with third sensors 421, a third shutoff valve 423, and a third locking mechanism 425; a first mobile device 429; a second mobile device 427; a computing system 431; and a database 435. As will be appreciated, various distributed or centralized configurations may be implemented without departing from the scope of the present invention. In exemplary embodiments, the database 435 can store the sensor data 437 and maintenance notifications 439, as discussed herein. Each of the bathroom stalls 403, 411, 419 is equipped with an annular fluid containment basin configured to encircle the base of a toilet and collect fluid flowing down the exterior surface of the toilet, as discussed above in reference to FIGS. 1-2. As discussed above, the sensors 405, 413, 421 are disposed within their respective annular fluid containment basins in order to detect a spill or overflow of the toilets. In exemplary embodiments, computing system 431 can store and execute a maintenance module 433 which can implement one or more of the processes described herein, or portions thereof. It will be appreciated that the module functionality may be implemented as a greater number of modules than illustrated and that the same server or computing system could also host multiple modules.

In exemplary embodiments, the computing system 431 can monitor the sensors 405, 413, 421 of each bathroom stall 403, 411, 419 and execute a maintenance module 433. The maintenance module 433 can communicate with sensors 405, 413, 421; shutoff valves 407, 415, 423; locking mechanisms 409, 417, 425; and mobile devices 427, 429 in order to receive sensor data and alerts from the sensors 405, 413, 421; transmit maintenance notifications; and transmit instructions to the shutoff valves 407, 415, 423 and locking mechanisms 409, 417, 425, as described herein. In some embodiments, the maintenance module 433 can transmit a maintenance notification to one of the mobile devices 427, 429 in order to notify a user of one of the mobile devices 427, 429 that one of the bathroom stalls 403, 411, 419 needs maintenance. In exemplary embodiments, the maintenance module 433 can transmit a notification to the mobile electronic device among the devices 427, 429 that is closest to the spill detected by one of the sensors 405, 413, 421. For example, the devices 427, 429 may periodically report location data that is accessible by the maintenance module which can be used to determine the devices current location with respect to the spill. The notification can also indicate a severity of the spill detected, and that information can be used by the maintenance module to determine a priority for attending to the cleanup of the spill. If multiple spills are detected and multiple notifications are transmitted to one or more of the mobile devices 427, 429, the notifications can instruct an individual to attend to the highest priority spill first.

In exemplary embodiments, the computing system 431 may include, but is not limited to, work stations, computers, general purpose computers, Internet appliances, hand-held devices, wireless devices, portable devices, wearable computers, cellular or mobile phones, portable digital assistants (PDAs), tablets, ultrabooks, netbooks, laptops, desktops, multi-processor systems, microprocessor-based or programmable consumer electronics, game consoles, set-top boxes, network PCs, mini-computers, smartphones, and the like. The computing system 431 may include some or all components described in relation to computing device 500 shown in FIG. 5.

The first and second mobile devices 427, 429 may connect to the network 401 via a wired or wireless connection. The first and second mobile devices 427, 429 may include one or more applications such as, but not limited to, a web browser, an object reader application, a geo-location application, and the like. In exemplary embodiments, individuals can use the first and second mobile devices 427, 429 to receive notifications regarding where maintenance is required.

In exemplary embodiments, the first bathroom stall 403, second bathroom stall 411, third bathroom stall 419, first mobile device 429, second mobile device 427, computing system 431, and database 435 may be in communication with each other via the communication network 401. The communication network 401 may include, but is not limited to, the Internet, an intranet, a LAN (Local Area Network), a WAN (Wide Area Network), a MAN (Metropolitan Area Network), a wireless network, an optical network, and the like. In one embodiment, the first bathroom stall 403, second bathroom stall 411, third bathroom stall 419, first mobile device 429, second mobile device 427, computing system 431, and database 435 can transmit instructions to each other over the communication network 401. In exemplary embodiments, the sensor data 437 and maintenance notifications 439 can be stored at the database 435 and received at the first mobile device 429, second mobile device 427, or computing system 431 in response to a service performed by a database retrieval application.

Figure 5:
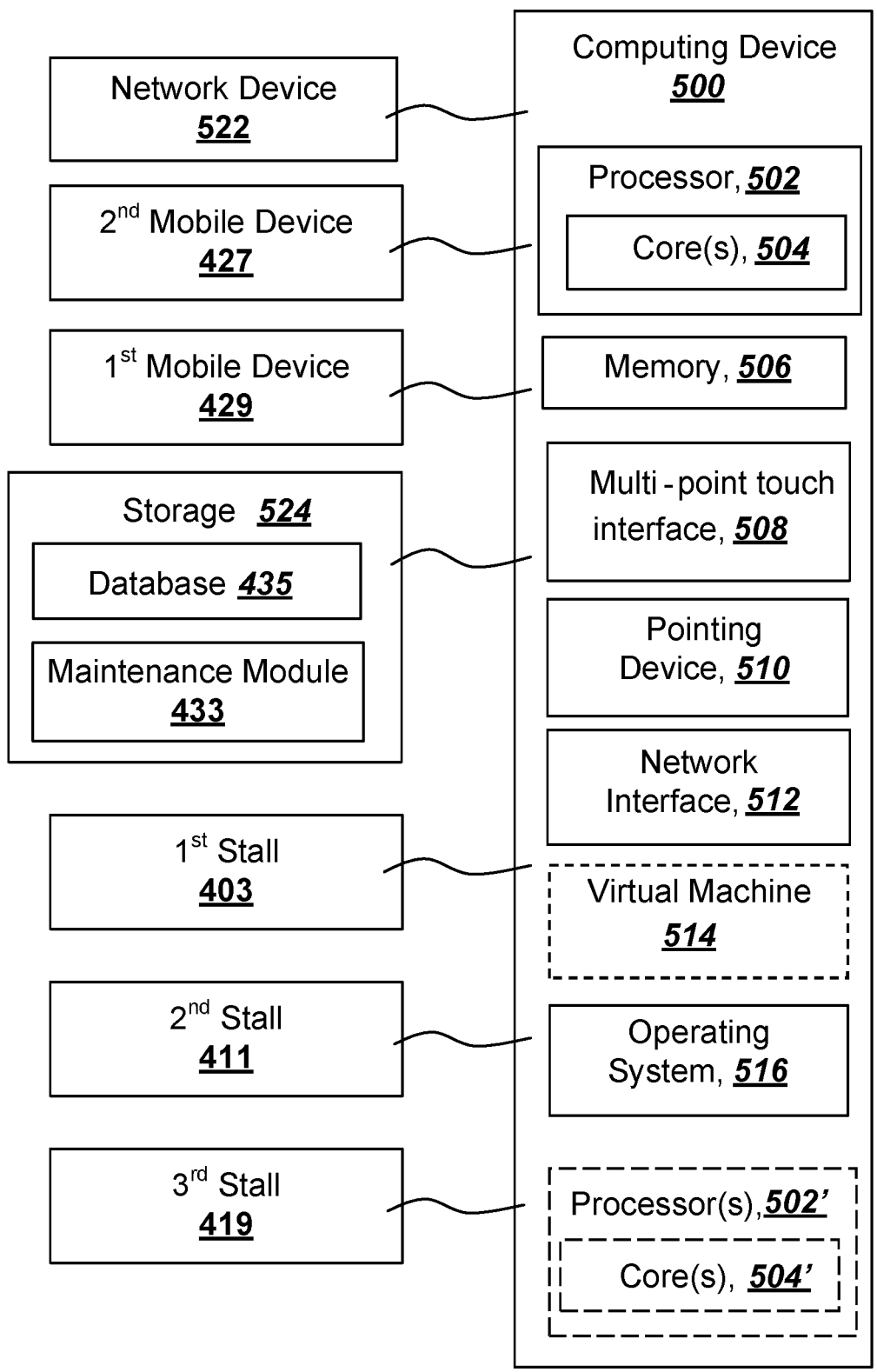
FIG. 5 is a block diagram of an exemplary computing device that can be used to perform exemplary processes in accordance with an exemplary embodiment.

FIG. 5 is a block diagram of an exemplary computing device 500 that can be used in the performance of the methods described herein. The computing device 500 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 506 included in the computing device 500 can store computer-readable and computer-executable instructions or software for implementing exemplary embodiments and programmed to perform processes described above. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can be non-transitory computer-readable media including a computer system memory or random access memory, such as DRAM, SRAM, EDO RAM, and the like. Memory 506 can include other types of memory as well, or combinations thereof.

The computing device 500 can also include other I/O devices for receiving input from a user, for example, a keyboard or any suitable multi-point touch interface 508, a pointing device 510 (e.g., a pen, stylus, mouse, or trackpad). The multi-point touch interface 508 and the pointing device 510 can be coupled to a display unit in some embodiments. The computing device 500 can include other suitable conventional I/O peripherals.

The computing device 500 can also include one or more storage devices 524, such as a hard-drive, CD-ROM, or other non-transitory computer readable media, for storing data and computer-readable instructions and/or software, such as a maintenance module 433, that can implement exemplary embodiments of the methods and systems as taught herein, or portions thereof. Exemplary storage device 524 can also store one or more databases 435 for storing any suitable information required to implement exemplary embodiments. The databases 435 can be updated by a user or automatically at any suitable time to add, delete, or update one or more items in the databases. Exemplary storage device 524 can store one or more databases 435 for storing the sensor data 437, maintenance notifications 439, and any other data/information used to implement exemplary embodiments of the systems and methods described herein.

The computing device 500 can also be in communication with a first bathroom stall 403, a second bathroom stall 411, a third bathroom stall 419, a first mobile device 429, and a second mobile device 427, as described above in reference to FIGS. 3-4. In exemplary embodiments, the first bathroom stall 403, second bathroom stall 411, and third bathroom stall 419 can each be equipped with an annular fluid containment basin, a moisture sensor, a fluid shutoff valve, a locking mechanism, and a motion sensor. The annular fluid containment basins can contain a spill, and the moisture sensors can be configured to detect the spill and notify the maintenance module 433 that a spill has occurred. Once a spill is detected, the maintenance module 433 can transmit a notification to the first mobile device 429 or the second mobile device 427 notifying a user of the device that one of the stalls needs maintenance.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 500 can run operating system 516, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations described herein. In exemplary embodiments, the operating system 516 can be run in native mode or emulated mode. In an exemplary embodiment, the operating system 516 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

What is claimed is:

1. A toilet overflow containment system comprising:
   an annular fluid containment basin disposed proximally to a base of an exterior surface of a toilet and configured to encircle the base and collect fluid flowing down the exterior surface;
   a drain disposed within the annular fluid containment basin and configured to direct fluid to bypass an S-bend or trap connected to the toilet; and
   a moisture sensor disposed within the annular fluid containment basin and configured to sense a spill.

2. The system of claim 1, wherein the annular fluid containment basin includes a level indicator on an interior wall of the annular fluid containment basin, the level indicator visually indicating an amount of fluid spilled.

3. The system of claim 1, further comprising:
   a fluid shutoff valve in communication with the moisture sensor and configured to interrupt a supply of fluid to the toilet in response to the moisture sensor detecting a spill.

4. The system of claim 1, further comprising:
a processing device in communication with the moisture sensor, the processing device configured to transmit a notification to a computing device indicating that the toilet needs maintenance.

5. The system of claim 4, wherein the notification indicates a severity of the spill detected enabling a priority to be assigned to a cleanup of the spill.

6. The system of claim 1, wherein the annular fluid containment basin is integral to the base of the toilet.

7. A toilet overflow containment system, comprising:
an annular fluid containment basin disposed proximally to a base of an exterior surface of a toilet, the annular fluid containment basin configured to encircle the base and collect fluid flowing down the exterior surface;
a drain disposed within the annular fluid containment basin and configured to direct fluid to bypass an S-bend or trap connected to the toilet;
a moisture sensor disposed within the annular fluid containment basin and configured to sense a spill; and
a door locking mechanism in a bathroom stall surrounding the toilet, the door locking mechanism in communication with the moisture sensors and configured to lock a door of the stall in response to receiving a signal indicating a spill detection.

8. The system of claim 7, further comprising:
motion sensors disposed within the bathroom stall and in communication with the door locking mechanism, the motion sensors preventing locking of the bathroom stall if a movement occurred within a pre-determined amount of time.

9. The system of claim 7, further comprising:
a processing device in communication with the moisture sensor and the door locking mechanism, wherein the processing device is configured to transmit a notification to a computing device indicating that the toilet needs maintenance.

10. The system of claim 9, wherein the door locking mechanism is further configured to prevent unauthorized persons from entering the bathroom stall following the spill detection.

11. The system of claim 9, wherein the notification indicates a severity of the spill detected enabling a priority to be assigned to a cleanup of the spill.

12. A system for monitoring toilet spills, the system comprising:
a plurality of bathroom stalls respectively including a toilet, each toilet equipped with an annular fluid containment basin disposed proximally to a base of an exterior surface of the toilet and configured to encircle the base and collect fluid flowing down the exterior surface;
a moisture sensor disposed within each annular fluid containment basin and configured to sense a spill; and
a computing system configured to monitor the moisture sensors and execute a maintenance module configured to:
receive alerts from the moisture sensors in response to spills being detected;
determine a priority of the alerts based on a determined severity of each spill; and
transmit a notification to a mobile electronic device associated with a user, the notification prompting the user to attend to a highest priority spill.

13. The system of claim 12, wherein the maintenance module is further configured to communicate with a locking mechanism associated with a door of a bathroom stall where a spill is detected to lock the door.

14. The system of claim 13, wherein the door locking mechanism is further configured to prevent unauthorized persons from entering the bathroom stall.

15. The system of claim 13, further comprising:
a motion sensor associated with each bathroom stall and in communication with the door locking mechanism, the infrared sensor preventing locking of the bathroom stall if a movement occurred within a pre-determined amount of time.

16. The system of claim 12, wherein the maintenance module is further configured to communicate with a fluid supply valve to interrupt a supply of fluid to a toilet in response to a spill being detected.

17. The system of claim 16, wherein the maintenance module is further configured to reconnect a supply of fluid to the toilet once the spill has been stopped.

18. The system of claim 12, wherein the maintenance module is in communication with a plurality of mobile electronic devices associated with users at different geographical locations.

19. The system of claim 18, wherein the maintenance module is configured to transmit a notification to a mobile electronic device among the plurality of mobile electronic devices that is located closest to a particular spill.

* * * * *